June 21, 1932.   G. W. HALL   1,864,195
LUBRICATOR
Original Filed June 11, 1928
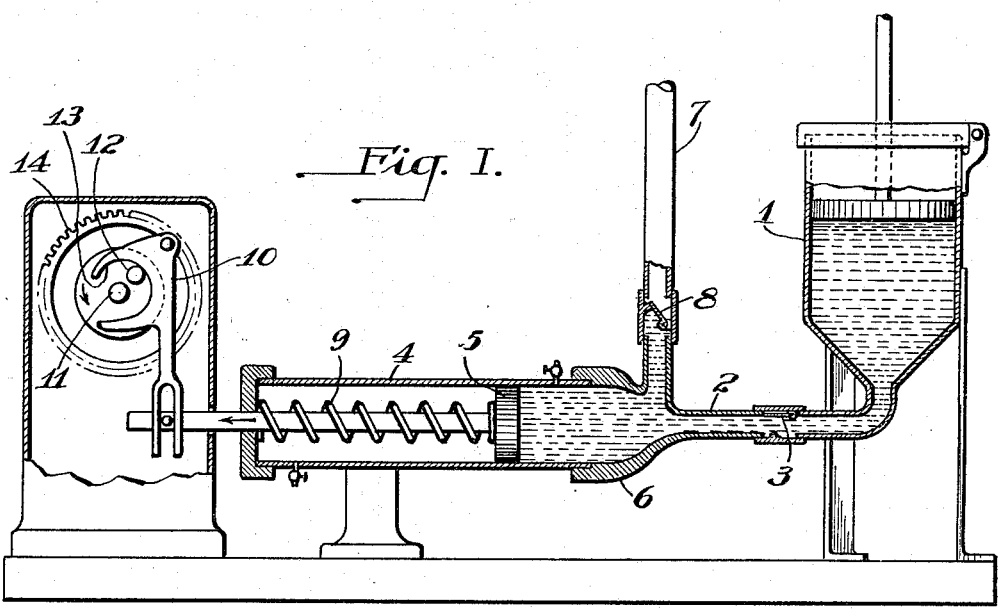
Fig. I.
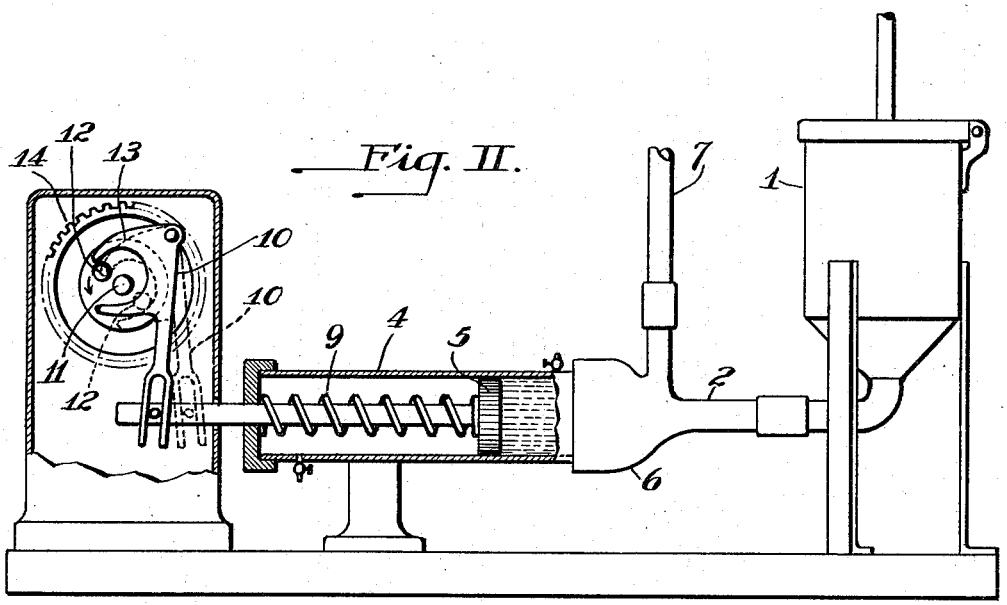
Fig. II.
WITNESS
A.B.Wallace.
INVENTOR
George Willis Hall
by Christy and Christy
his attorneys Patented June 21, 1932

1,864,195

UNITED STATES PATENT OFFICE

GEORGE WILLIS HALL, OF WILKINSBURG, PENNSYLVANIA

LUBRICATOR

Application filed June 11, 1928, Serial No. 284,412. Renewed August 29, 1931.

This invention relates to improvements in lubricating apparatus, and, while not limited in this respect, finds practical value when embodied in apparatus for feeding to machinery lubricant of heavy and viscid character. The object in view is to feed the lubricant positively and automatically, at predetermined rate.

The two figures of the accompanying drawing show in longitudinal section, and in part in elevation, lubricating apparatus in which the invention is embodied, moving parts being shown in alternate positions in the several figures.

A supply tank for the lubricant is shown at 1, and since, as has been said, lubricant of heavy and viscid nature is primarily contemplated, I give to this tank cylindrical form; set it in vertical position; provide it with a funnel-shaped bottom, centrally ported, and arrange within the cylinder a piston capable of being weighted, so as to maintain the lubricant supply always tending to flow from the supply tank when free to do so.

A supply pipe 2 with a check valve 3 opening in the direction of flow from the tank, leads to a grease gun. The grease gun consists of a cylinder 4 in which works a piston 5. The cylinder terminates in a funnel-shaped delivery end 6 centrally ported. Into such central port the supply pipe 2 opens, and from this central port a delivery pipe 7 branches. In the delivery pipe a check valve 8 is arranged, which check valve opens in the direction of flow from the grease gun. The delivery pipe, it will be understood, leads to the bearings or other machine parts to be lubricated.

A spring 9, bearing upon piston 5, tends always to carry the piston to the discharge end of its range of reciprocation and to hold it there. A bell-crank lever 10 pivoted in a stationary support engages the stem of piston 5, and when this lever swings in clockwise direction (as seen in the drawing) it draws the piston from right to left within the cylinder, against the tension of spring 9.

A rotary shaft 11 carries a disk in which is borne a crank pin 12; the power arm of the bell-crank lever is provided with a cam surface 13 which, engaged by crank pin 12, causes the rotation of shaft 11 to be effective to swing the bell-crank lever. As seen in the figures, the direction of rotation of shaft 11 is counter-clockwise. Considering particularly Fig. II, it will be perceived that as in the turning of shaft 11 crank-pin 12 advances from the dotted-line position to the full-line position, the bell-crank lever will by shaft rotation be swung in clockwise direction, and piston 5 will be drawn against spring tension from the inner to the outer limit of its range of reciprocation. Further turning of the shaft 11 will carry the crank-pin 12 beyond engagement with the cam surface 13. Thereupon the piston 5, unrestrained, will respond to the tension of spring 9 and make its left to right stroke.

It has been said that the invention finds particular application in the feeding of viscid grease, and it includes provision for carrying the piston 5 positively to the outward limit of its stroke; and, in consequence, the viscosity of the lubricant cannot result in deficiency in the predetermined rate of delivery. Further consideration of Fig. II will show that as rotation of shaft 11 continues, and as crank-pin 12 advances in counter-clockwise direction from the full-line to the dotted-line position, it will (if the swing of the bell-crank lever has been through a range less than complete) by engagement again with the cam surface 13 carry the bell-crank lever to the limit of its counter-clockwise swing. This limit is reached in the dotted-line position of crank pin 12, as shown in Fig II.

It will be observed that the dotted-line position of the crank-pin (the position which defines the limit of the swing of the bell-crank in one direction) is diametrically opposite the full-line position (the position which defines the limit of swing in the other direction) ; and it will be observed that the diametrical line through the center of shaft turning and through the center of the pin in these opposite positions, is approximately perpendicular to the line drawn through the center of shaft rotation and the fulcrum upon which the bell-crank lever swings. And it will be observed that the cam surface is so shaped that the point of its tangency (with relation to the center of shaft turning) is upon the outer and forward quadrant of the circumference of the pin.

Rotation of shaft 11 may be effected in any desired manner. A gear wheel 14 indicates that it may be rotated at relatively slow speed, but in synchronism with the rotation of the shaft of an engine whose lubrication this apparatus effects.

In operation tank 1, pipe 2, cylinder 4, and pipe 7 are full of lubricant. The supply of lubricant in tank 1 tends always to flow through pipe 2. Piston 5 always tends to move from left to right. Rotation of shaft 11 has the effect of periodically drawing piston 5 from right to left to the limit of its range of movement in that direction and there releasing it. In corresponding periodicity spring 9 is effective to drive piston 5 from the limit of its range of movement to the left in left to right direction; and if, in consequence of the viscosity of the lubricant, the spring is ineffective to drive the piston to the limit of its range of movement to the right, further turning of shaft 11 is effective to accomplish this.

Right to left traverse of piston 5 draws lubricant from tank 1, through pipe 2, into cylinder 4; left to right traverse of the piston drives lubricant from the cylinder through pipe 7 to the parts to be lubricated. And since the range of piston traverse is by the cam surface 13 precisely determined, the quantity of lubricant delivered on each stroke will be uniformly the predetermined quantity.

I claim as my invention:

In lubricating apparatus a supply tank for lubricant, a cylinder provided through one head with a single receiving and discharging port, valve-controlled communication from said tank through said port to said cylinder, a valve-controlled discharge passageway with which through said port said cylinder communicates, a piston in said cylinder, means tending always to carry the piston to the limit of its discharge traverse, a bell-crank lever mounted on a fixed fulcrum and adapted to swing in a plane to which the axis of the said cylinder is parallel, one arm of said lever engaging the said piston by slot-and-pin engagement, and the other arm of said lever being bifurcated, and a rotatable shaft equipped with a crank-pin, the shaft being so arranged that during one part of its cycle of turning the crank-pin alternately engages the bifurcated arm of said bell-crank lever, first on one side and then on the other, and during another part of the cycle the crank-pin is free of engagement with the lever arm, whereby, after the means first named have been effective to shift the piston, the shaft by rotation is effective, through crank-pin and bell-crank lever, first to shift the piston through any still untraversed portion of its discharge stroke and then to shift the piston throughout its receiving stroke.

In testimony whereof I have hereunto set my hand.

GEORGE WILLIS HALL.